US008838926B2

(12) United States Patent
Hull et al.

(10) Patent No.: US 8,838,926 B2
(45) Date of Patent: *Sep. 16, 2014

(54) INTERACTING WITH DATA IN HIDDEN STORAGE

(76) Inventors: Steven Allen Hull, Snoqualmie, WA (US); Stephen Michael Teglovic, Sammamish, WA (US); Jared Maxwell Proske, Seattle, WA (US); Daniel John Clemens, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/487,768

(22) Filed: Jun. 4, 2012

(65) Prior Publication Data

US 2012/0246420 A1   Sep. 27, 2012

Related U.S. Application Data

(63) Continuation of application No. 12/579,301, filed on Oct. 14, 2009, now Pat. No. 8,200,930, which is a continuation-in-part of application No. 12/579,208, filed on Oct. 14, 2009.

(60) Provisional application No. 61/105,371, filed on Oct. 14, 2008.

(51) Int. Cl.
　　*G06F 12/00*　　(2006.01)
　　*G06F 13/00*　　(2006.01)
　　*G06F 13/28*　　(2006.01)
　　*G06F 17/30*　　(2006.01)
　　*G06F 21/78*　　(2013.01)

(52) U.S. Cl.
　　CPC .......... *G06F 17/30138* (2013.01); *G06F 21/78* (2013.01)
　　USPC ............................ 711/163; 711/170; 711/173

(58) Field of Classification Search
　　USPC .................. 711/163–164, 170, 173
　　See application file for complete search history.

(56) References Cited

U.S. PATENT DOCUMENTS

| | | | |
|---|---|---|---|
| 7,584,226 B2 | 9/2009 | Fatula et al. ...................... 1/1 |
| 2002/0026580 A1 | 2/2002 | Igari | |
| 2004/0078511 A1 | 4/2004 | Vogt ............................. 711/103 |
| 2005/0066145 A1 | 3/2005 | Han .............................. 711/173 |
| 2005/0257017 A1 | 11/2005 | Yagi ............................ 711/163 |
| 2006/0225065 A1 | 10/2006 | Chandhok et al. ............ 717/168 |
| 2006/0294298 A1 | 12/2006 | Peterson ...................... 711/112 |
| 2007/0050326 A1 | 3/2007 | Budhabhatti ..................... 707/1 |
| 2007/0186070 A1 | 8/2007 | Federa ......................... 711/163 |
| 2007/0186124 A1 | 8/2007 | Streibl ......................... 713/400 |
| 2008/0147821 A1 | 6/2008 | Dietrich et al. .............. 709/216 |
| 2008/0168247 A1 | 7/2008 | Goodwill ..................... 711/163 |
| 2009/0089612 A1 | 4/2009 | Mathew et al. .................. 714/6 |
| 2010/0095082 A1 | 4/2010 | Hull ............................ 711/163 |
| 2010/0100587 A1 | 4/2010 | Teglovic ...................... 709/203 |
| 2010/0332813 A1 | 12/2010 | Rothman ......................... 713/2 |

OTHER PUBLICATIONS

International Search Report mailed May 30, 2011, issued in PCT/US2010/052464.
Office Action mailed Dec. 9, 2010, in U.S. Appl. No. 12/579,208.

(Continued)

*Primary Examiner* — Ryan Bertram (57) ABSTRACT

Unused storage space within a data storage is utilized to store data while effectively making it appear to the operating system, other programs, and the user that the space is still available or unused. The space used to store the hidden data remains available for use by the operating system, other programs and uses upon a request. File system requests are monitored such that the hidden storage area remains hidden from unauthorized processes as well as to restrict operations within the hidden storage area that are attempted by unauthorized processes.

20 Claims, 8 Drawing Sheets

(56) References Cited

OTHER PUBLICATIONS

Office Action mailed Jun. 21, 2011, in U.S. Appl. No. 12/579,208.
Office Action mailed Feb. 6, 2012, in U.S. Appl. No. 12/579,301.
Office Action mailed Mar. 12, 2012, in U.S. Appl. No. 12/579,208.
Office Action mailed Jan. 31, 2013, in U.S. Appl. No. 12/579,208.
European Supplemental Search Report in European Application 10823997, mailed Mar. 31, 2014, 5 pgs.
U.S. Appl. No. 12/579,301, Notice of Allowance mailed Apr. 12, 2012, 11 pgs.

INTERACTING WITH DATA IN HIDDEN STORAGE

RELATED APPLICATIONS

The present application is a continuation of U.S. application Ser. No. 12/579,301, filed Oct. 14, 2009, entitled "INTERACTING WITH DATA IN HIDDEN STORAGE" indicated to be granted as U.S. Pat. No. 8,200,930, on Jun. 12, 2012, which is continuation-in-part of U.S. patent application Ser. No. 12/579,208 filed Oct. 14, 2009, entitled "SYSTEMS AND METHODS FOR A DATA MANAGEMENT AND RECOVERY IN A PEER-TO-PEER NETWORK" which is the non-provisional application of U.S. Provisional Patent Application No. 61/105,371, filed Oct. 14, 2008, which are incorporated herein in their entirety by reference and claims the benefit of the effective filing date under 35 U.S.C. §120.

BACKGROUND

Computers use file systems to store and organize data on computer readable media, such as on hard drives, flash drives, optical drives, CDs and DVDs. Generally, the operating system controls access to the file system and is responsible for managing the stored data. Most operating systems provide an interface that is located between the programs and the file system that is used in interacting with the stored data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Unused space within a data storage device is utilized to store data such that it is hidden from unauthorized processes. These unauthorized processes may include the operating system as well as other programs/processes. The space used to store the hidden data remains available for use by any process. File system requests are monitored such that the hidden storage area remains hidden from unauthorized processes as well as to restrict operations within the hidden storage area that are attempted by unauthorized processes. For example, a request by an unauthorized program asking for the amount of available space on a storage device is intercepted and a value for the available space is returned to the unauthorized process that includes the size of the hidden storage and a size of the available space on the storage device. Similarly, other requests, such as a directory request, a write request, a volume request, a create request, and the like made by unauthorized processes may be restricted or results modified when they involve access to the hidden storage.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
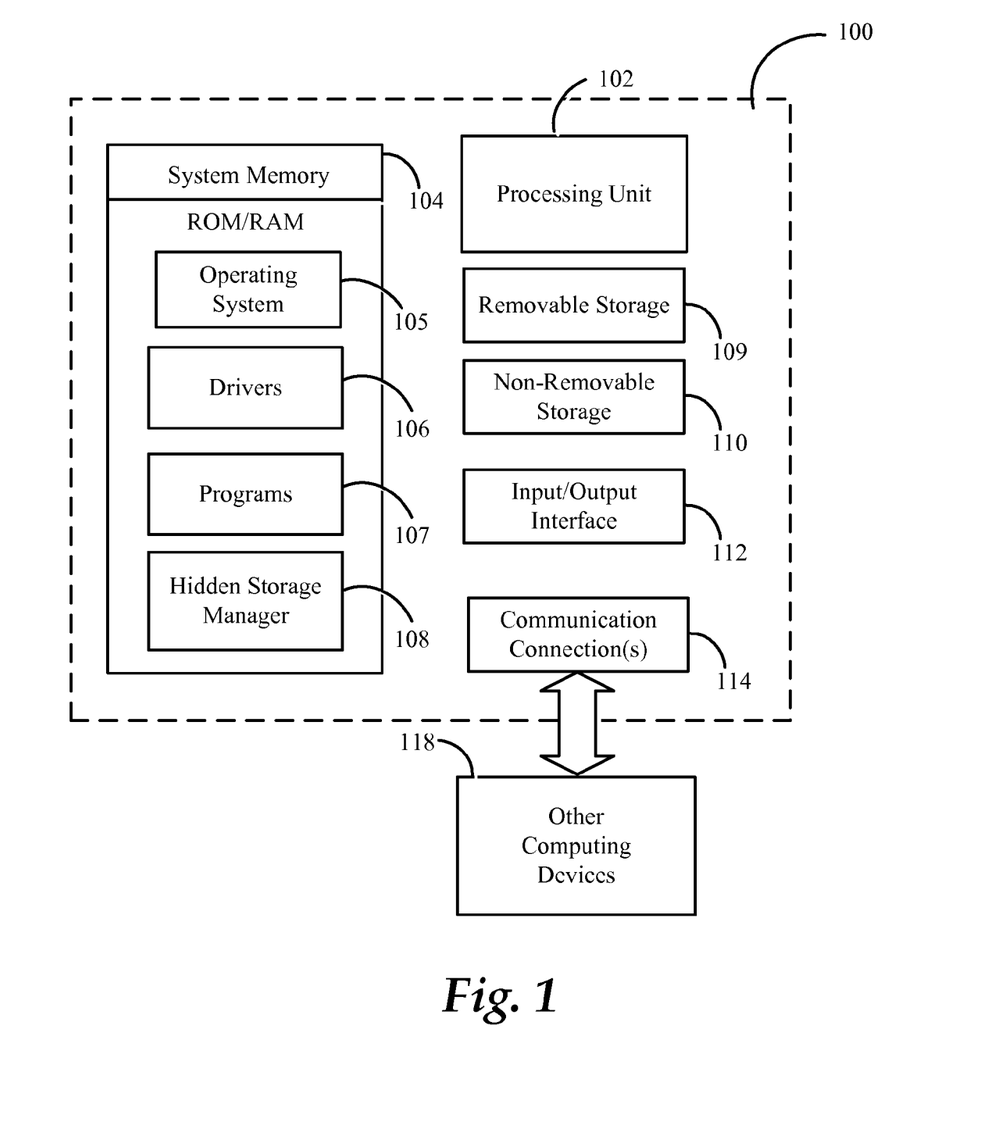
FIG. 1 illustrates an exemplary computing device.

Referring now to FIG. 1, a computing device 100 for interacting with data in a hidden storage is illustrated. The computing device may include many more components than those shown in FIG. 1. As shown in FIG. 1, computing device is connected to a network, such as the Internet, via communication connection(s) 114. The communication connection(s) 114 may be wired and/or wireless.

Computing device 100 also includes processing unit 102, system memory 104, operating system 105, drivers 106, programs 107, hidden storage manager 108, removable storage 109, non-removable storage 110 and input/output interface 112.

The system memory 104 generally includes RAM, ROM, and one or more permanent mass storage devices, such as removable storage 109 and/or non-removable storage 110. The system memory stores operating system 105 for controlling the operation of computing device 100. The operating system may comprise a general purpose operating system, such as the MICROSOFT XP®, MICROSOFT VISTA®, MICROSOFT 7®, UNIX, operating systems, or some other operating system that is used in storing and interacting with files on a computing device. The memory as described above illustrates a computer-readable storage media that may include volatile and nonvolatile, removable and non-removable media implemented in any method or technology for storage of information, such as computer readable instructions, data structures, program modules or other data. Examples of computer storage mediums include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The system memory also stores programs 107, drivers 106, and hidden storage manager 108 for providing functionality. Computing device 100 also comprises input/output interface 112 for communicating with external devices, such as a mouse, keyboard, scanner, or other input devices not shown in FIG. 1. Removable storage 109 and non-removable storage 110 may be utilized by computing device 100 to store, among other things, programs, databases, and program data used by computing device 100.

Data storage devices (such as a hard disc or memory drive) are generally managed by operating system 105 which manages access to the storage device and reports used and unused space on the device to the programs 107 running on the device.

Hidden storage manager 108 is directed at using a portion of the unused space on one or more storage devices while effectively making it appear to the operating system 105 and other programs 107 that the space is still available (i.e. unused). When the programs or operating systems request to use the space on the storage device that is being used as hidden storage, a portion of the hidden storage space is automatically released by hidden storage manager 108 to the program or operating system while tracking the unavailability of the hidden data stored within the storage device. Generally, the use of the hidden data storage is obscured from the operating system, other processes, programs, and the user. From the operating system, running other processes, programs', and user's point of view the hidden space remains available for use. Anytime space is needed, and space is being utilized within the hidden storage, enough space to satisfy the request is released for use. According to one embodiment, a performance margin is set and automatically maintained that keeps a buffer of empty space on the storage device such that requests for additional space may be satisfied without the need to first erase space being used in the hidden storage. Hidden storage manager 108 manages utilization of the available hidden storage space. According to one embodiment, access to the storage space is prioritized such that the operating system, other processes, and programs currently executing have the highest priority to the storage space, whereas the hidden storage is at the lowest priority level. In other words, any data that is stored in the hidden storage may be erased to make room for other data storage needs. Many types of prioritization schemes may be configured. For example, an operating system may be given the highest priority to the storage, core programs a second priority level, user programs a third level priority, and the like. The hidden storage may be used for many different purposes. For example, the hidden storage may be used to store backup data from other computer devices attached via one or more networks. The hidden storage may be used to increase the performance of a program, another computer on a network may temporarily store data on the computer's hidden storage, and the like.

Figure 2:
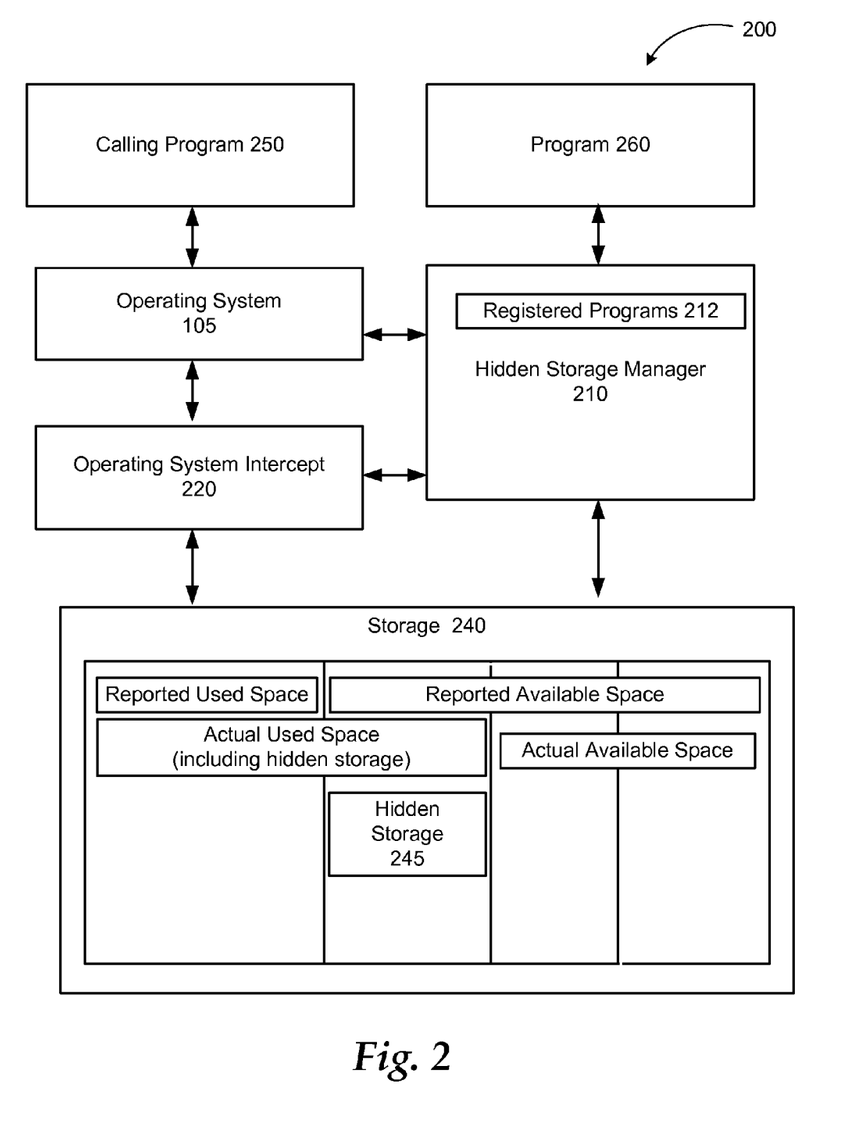
FIG. 2 shows a system for interacting with hidden storage.

Referring now to FIG. 2, a system 200 for interacting with hidden storage is described. As illustrated, hidden storage system 200 comprises hidden storage manager 210, operating system 105, operating system intercept 220, storage 240 that includes hidden storage 245, calling program 250 and program 260.

As discussed above, hidden storage manager 210 provides functionality for interacting with storage space 240 including hidden storage 245. According to one embodiment, operating system intercept 220 is utilized to intercept information requests and commands by programs 250, users, and the operating system to interact with data storage, such as storage 240. Intercepting some of the file system requests using OS intercept 220, hidden storage manager 210 alters the amount of available space reported by the operating system before it is returned to the calling program 250. Additionally, hidden storage manager 210 maintains information regarding the reported available space and the actual available space. As can be seen, when storage 240 includes hidden storage, then the reported available space is larger then the actual available space.

According to one embodiment, under the Microsoft Windows® operating system (Windows XP and later) an Installable File System Driver (operating system intercept 220) (generally implemented in a "File System Minifilter Driver" (the Hidden Storage Manager)) is used to intercept file system calls made to operating system 105. Generally, other methods of intercepting file system requests may be utilized. The operating system intercept 220 is configured to intercept calls made to the file system, such as the low level functions referred to as the I/O Request Packet (IRP) functions and pass them to hidden storage manager 210 for processing.

When started by the operating system, the hidden storage manager 210 registers "Preoperation" and/or "Postoperation" callbacks with the driver filter manager that is associated with operating system intercept 220 and operating system 105. These callback functions provide hidden storage manager 210 the opportunity to monitor, change, and report on actions which are relevant to the hidden storage. According to one embodiment, the hidden storage manager 210 register callbacks for a limited number of the I/O Request Packet (IRP) functions as discussed below.

When a program 250 or process initiates a call for a file system operation, the operating system resolves the request to one of a number of defined IRP functions. In operation, the operating system maintains a stack of the file system filters and drivers that are called depending on the IRP function. The operating system initiates a Preoperation call to each of the drivers in order which are in the stack prior to performing the actual requested operation. After the operating system has performed all the Preoperation calls to all the drivers in the stack, and assuming that all the Preoperation calls have indicated that they approve of continuing the operation, the operating system carries out the requested operation. Once the requested operation is completed, the operating system 105 begins to call each registered Postoperation callback in the stack of drivers in a similar fashion to the Preoperation callback routines.

Many of the IRP callback functions supported by the Installable File System Driver are a matter of software housekeeping and are not addressed here. These IRP functions handle matters such as shutting down the driver, querying the status of an individual file, reading from a file, changing the attributes of a file and so forth. According to one embodiment, the IRP's monitored by hidden storage manager 210 include IRP_MJ_CREATE for creating a file; IRP_MJ_DIRECTORY_CONTROL for interacting with directories; IRP_MJ_QUERY_VOLUME_INFORMATION for determining disk space and/or file type; and IRP_MJ_WRITE for writing a file. Generally, hidden storage manager 210 is configured to intercept file system requests made by programs to determine available/used storage space as well as requests to interact/create hidden storage within available storage space.

The hidden storage manager 210 provides an interface to application programs, the host operating system and other processes on the host computer. According to one embodiment, the hidden storage manager 210 creates this interface by utilizing the FltCreateCommunicationPort( . . . ) API within the Installable File System Driver Interface. This API provides a means through which other processes (i.e. program 260) can communicate directly with the hidden storage manager 210. A function of this API is to allow processes/programs to register with the hidden storage manager 210.

By registering, the program is informing the hidden storage manager 210 that the program is aware of the hiding functionality of the hidden storage manager 210 and the hidden storage manager 210 should provide special services to the programs that have registered (registered programs 212).

Figure 3:
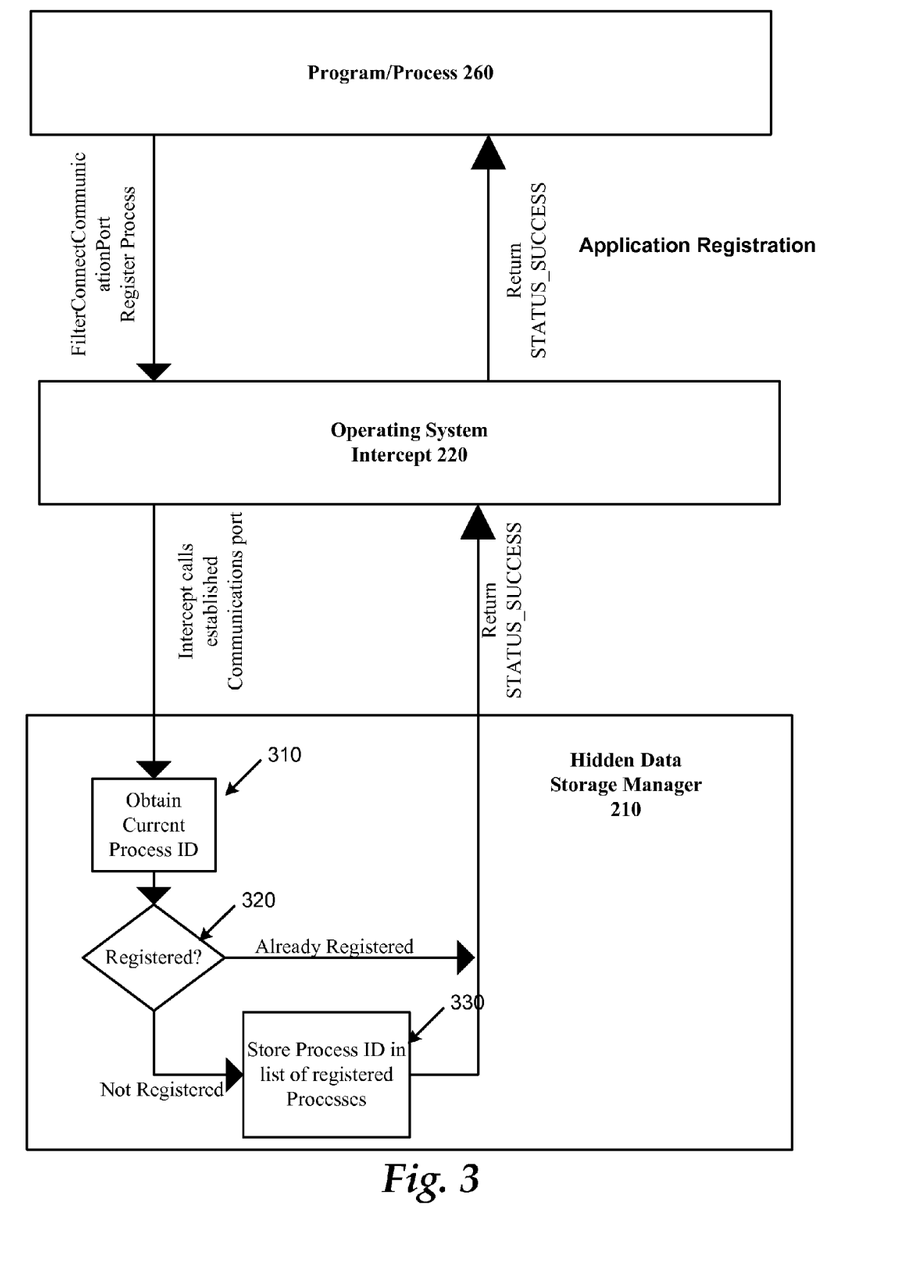
FIG. 3 illustrates a process for registering with a hidden storage manager.

Referring now to FIG. 3, a program, such as program/process 260, registers by calling the API created by operating system 105 when the hidden storage manager 210 is loaded. When the program calls the API to register, the hidden storage manager 210 performs operation 310 and obtains the current process ID for the caller. The process moves to operation 320 where a determination is made as to whether program 260 has already registered. When program 260 has not already registered, the process moves to operation 330 where the process ID is stored in the list of registered programs (see registered programs 212 in FIG. 2).

Returning to FIG. 2, after registration, the hidden storage manager 210 allows the registered program to examine and utilize the entire volume's storage space—including the hidden storage areas. The hidden storage manager 210 does not hide the hidden space from the registered programs and the registered programs can create files, create directories, write to files, delete files, delete directories, and in general use the hidden space as if the space within the hidden storage area was regular (non-hidden) space. Since no obscuring of the hidden files occur, no modification of the available space occurs and the calling program can be written using standard operating system API calls to manipulate the hidden storage area and can rely on the reported space available as the true and actual space which includes the hidden storage space.

According to one embodiment, hidden storage manager 210 is configured to set a performance margin that provides a buffer space for the programs and operating system to continue to expand before impacting the hidden storage. The use of the performance margin is directed at avoiding the repetitious cycle of delaying requests for use of storage, erasing hidden storage, and notifying programs which are using the hidden storage of the erasure. For example, without the use of the performance margin, the very first request by a user, program or operating system for additional space would result in some need to erase or free up some of the hidden storage area if the hidden storage utilized all of the available space on the storage device. The calculation of the performance margin may utilize many different factors such as: the total size of the storage; the performance of the host computer; the existing file sizes; the predictability of the host computer to require additional storage; and the like. This performance margin may be preset and/or configured through an API to hidden storage manager 210.

Hidden storage manager 210 is also configured to set the amount of storage space that may be used as hidden storage. For example, the amount of storage space that may be used as hidden storage may be: all of the available space on a device, the available space on the device minus the size of the performance margin, or some other determined size. According to one embodiment, the size of the storage device that may be used as hidden storage depends on a size of the storage device. According to one embodiment, the larger the storage space of the storage device, the higher percentage of the available storage space may be used as hidden storage. Generally, the size of the hidden storage space that may be used is set such that the operating system, non-registered programs, and users have enough available space without having to impact the space set aside as the hidden storage space.

The following examples are provided for illustration purposes only and are intended to be non-limiting.

In a first example, assume that a computing device includes a storage having the following attributes: 1 terra byte of total storage; 400 GB of consumed storage and 600 GB of free storage. In this example, a performance margin is set to 15% of the total storage or 20% of the free storage, whichever result is larger. In this case, since 15% of total storage (150 GB) is larger then 20% of the free storage (120 GB), the performance margin is set to 150 GB. In this example the hidden storage manager provides the use of approximately 450 GB of hidden storage space.

In another example, assume that a computing device includes a storage of the following attributes: 100 GB of total storage; 65 GB of consumed storage and 35 GB of free storage. In this example, the performance margin is set at either 25% of total storage or 30% of the free storage whichever is larger. Since 25% of the total storage (25 GB) is larger then 30% of free storage (10.5 GB), the performance margin is set to 25 GB. In this example the hidden storage manager provides the use of approximately 10 GB of hidden storage space.

In these two examples, the size of the storage device and the available free space are primary factors used in establishing the performance margin. Other factors may also be utilized, such as rate of use of space within drive, average file size within storage, type of primary use, a speed of the network connection, performance of the computing device/storage, and the like. Generally, the hidden storage space and performance margin is set such that the requests for the freeing of the hidden storage space is minimized Referring now to FIG. 4, hidden storage manager 210 is configured to hide files and directories from view by the non-registered programs, users and the operating system. Hidden storage manager 210 monitors and denies requests to access a path to files and directories that are used to store files within the hidden storage area when the request is from a non-registered programs. According to one embodiment, the IRP_MJ_DIRECTORY_CONTROL and IRP_MJ_QUERY_VOLUME_INFORMATION are monitored by operating system intercept 220 and passed to hidden storage manager 210.

Figure 4:
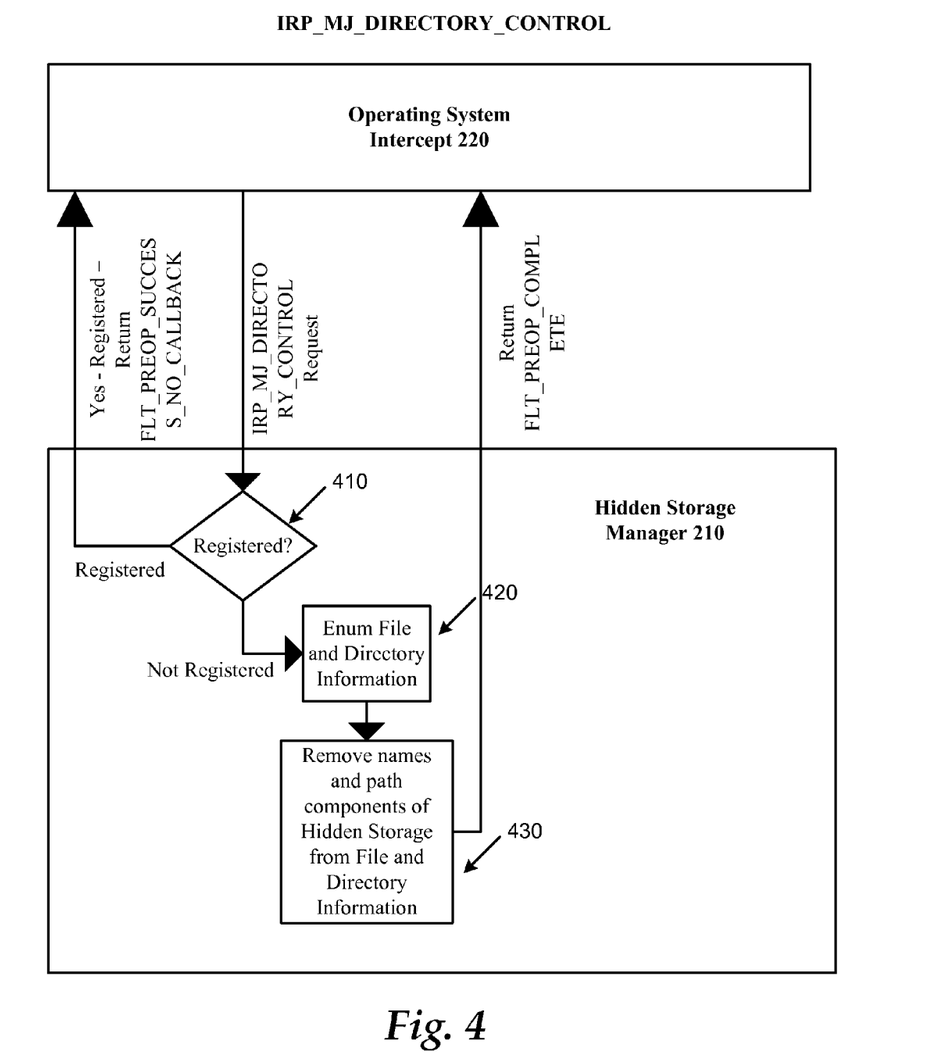
FIG. 4 shows a process for hiding directories and files within hidden storage.

As discussed above, hidden storage manager 210 utilizes a Preoperation callback to monitor the calls. Upon the call into the Preoperation callback for the IRP_MJ_DIRECTORY_CONTROL, hidden storage manager 210 moves to decision operation 410 and determines if the calling process has been previously registered with the hidden storage manager 210 by checking the registered programs 212. If the process is registered with the hidden storage manager 210, then the process is entitled to see all of the directory information and the hidden storage manager 210 returns from the Preoperation callback indicating: FLT_PREOP_SUCCESS_NO_CALLBACK. This return value informs the operating system intercept 220 that the hidden storage manager 210 is finished with this operation and does not require any more callbacks related to this function. In essence, the handling of the IRP_MJ_DIRECTORY_CONTROL in this manner with a registered process serves to allow the registered process full access to the hidden storage.

When the hidden storage manager 210 determines that the process is not registered, it moves to operation 420 and begins the process of constructing the information to fulfill the IRP_MJ_DIRECTORY_CONTROL request. The hidden storage manager 210 utilizes functions/API's provided by the operating system to enumerate the directory and file information on the desired volume while constructing the proper data structures for returning to the calling process. During this enumeration of the files and directories, the hidden storage manager 210 examines each to determine if any of the files or directories are contained within the hidden data storage area. If the hidden storage manager 210 discovers files or directories which reside within the hidden data storage area, the process moves to operation 430 where the hidden storage manager 210 removes or omits this information from the data being assembled for return to the calling process. Upon completion of the data assembly, the hidden storage manager 210 returns from the Preoperation callback indicating: FLT_PREOP_COMPLETE. This return value informs the operating system intercept 220 that the hidden storage manager 210 has completed the operation and the operating system is not to call any of the remaining filters in the filter stack and will not call the file system.

When returned to the unregistered calling application or program, the results of the IRP_MG_DIRECTORY_CONTROL request do not contain information referencing the hidden directories or files.

Figure 5:
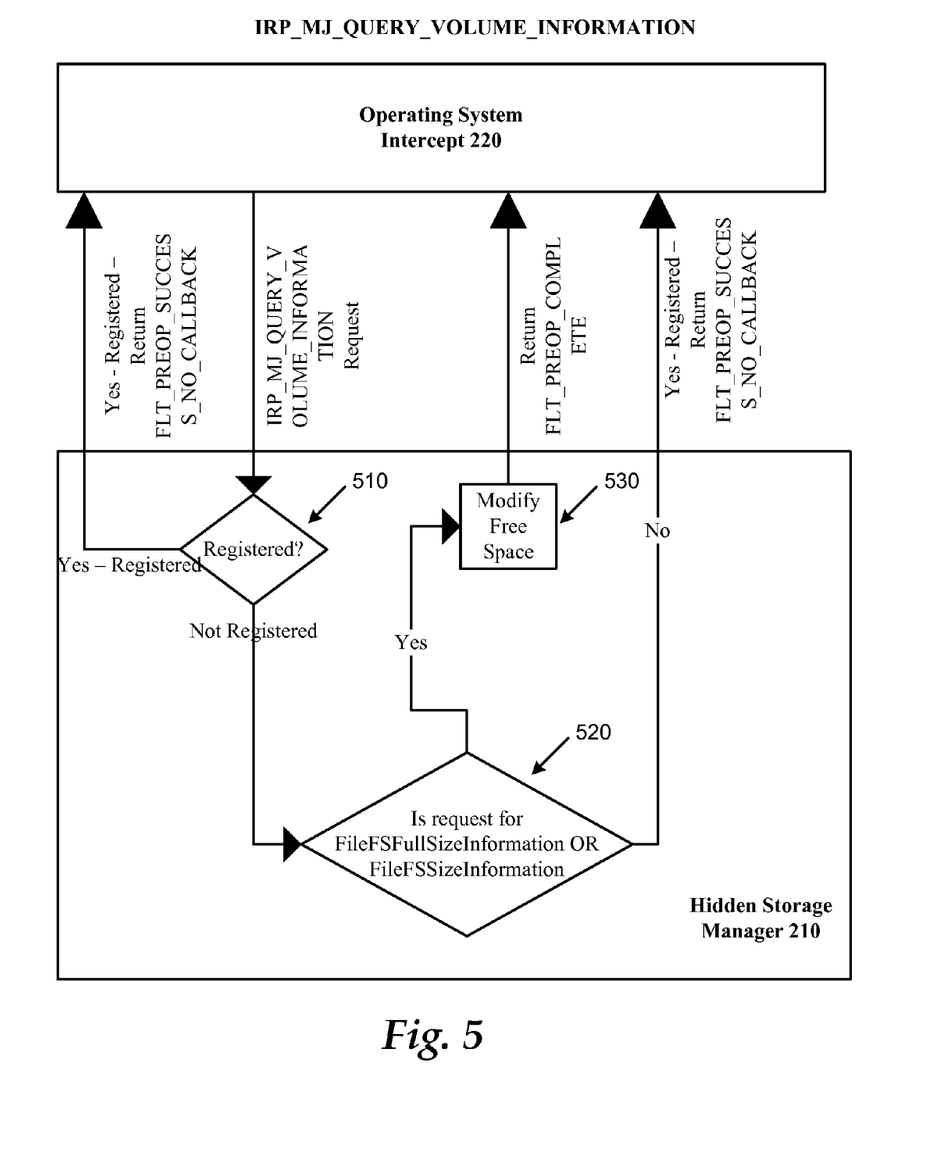
FIG. 5 illustrates a process for intercepting volume queries.

Turning now to FIG. 5, a process for intercepting volume queries is described. Operating system 220 is configured to intercept volume query requests and pass them to hidden storage manager 210. Upon the call into the Preoperation callback for the IRP_MJ_VOLUME_INFORMATION, hidden storage manager 210 moves to operation 510 and determines if the calling process has been previously registered with the hidden storage manager 210. If the process is registered with the hidden storage manager 210, then the process is entitled to see all of the directory information and the hidden storage manager 210 returns from the Preoperation callback indicating: FLT_PREOP_SUCCESS_NO_CALLBACK. This return value informs the operating system intercept 220 that the hidden storage manager 210 is finished with this operation and does not require any more callbacks related to this function. In essence, the handling of the IRP_MJ_VOLUME_INFORMATION in this manner with a registered process serves to allow the registered process full access to the hidden storage.

When the hidden storage manager 210 determines that the process is not registered, the process moves to operation 520, where a determination is made as to whether the request is either a FileFSFullSizeInformation request or a FileFSSizeInformation request. These sub function operations request specific size information about directories and files within the volume.

If the hidden storage manager 210 determines the sub function request is not one of the above calls, it returns from the Preoperation callback indicating: FLT_PREOP_SUCCESS_NO_CALLBACK. If the sub function request is one of the above calls, the hidden storage manager 210 utilizes functions/API's provided by the operating system to construct the proper data structures for returning to the calling process. Once the proper data structures have been assembled, the hidden storage manager 210 moves to operation 530 and modifies the available space values being returned to exclude the space currently used by the hidden storage area. Upon completion of the data assembly and the modification of the available space values, the hidden storage manager 210 returns from the Preoperation callback indicating: FLT_PREOP_COMPLETE. This return value informs the operating system intercept 220 that the hidden storage manager 210 has completed the operation and the Filter Manager is not to call any of the remaining filters in the filter stack and will not call the file system.

Figure 6:
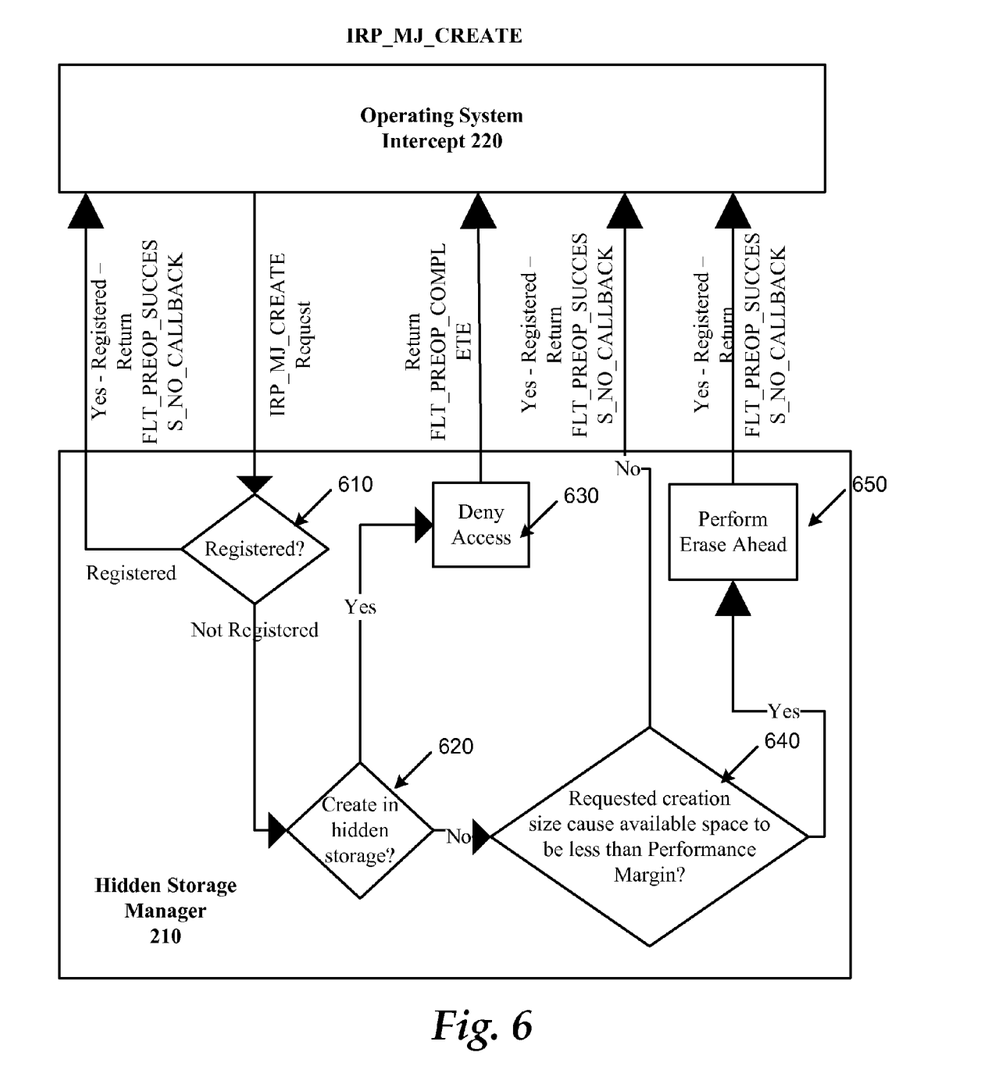
FIG. 6 shows a process for intercepting create file requests.

Referring to FIG. 6, a process for intercepting create file requests is described. Operating system 220 is configured to intercept creates requests and pass them to hidden storage manager 210. According to one embodiment, hidden storage manager 210 monitors for the IRP_MJ_CREATE function. Upon the call into the Preoperation callback for the IRP_MJ_CREATE, the hidden storage manager 210 determines at operation 610 if the calling process has been previously registered with the hidden storage manager 210. If the process is registered with the hidden storage manager 210, then the process is entitled to full access to the volume and the hidden storage manager 210 returns from the Preoperation callback indicating: FLT_PREOP_SUCCESS_NO_CALLBACK. This return value informs the operating system intercept 220 that the Driver is finished with this operation and does not require any more callbacks related to this function. In essence, the handling of the IRP_MJ_CREATE in this manner with a registered process serves to allow the registered process full access to the hidden storage.

When the hidden storage manager 210 determines that the process is not registered, the hidden storage manager 210 moves to operation 620 and further determines if the creation of the file or directory is targeted for the hidden storage area on the volume. If the creation is requested to occur within the hidden storage area, the process moves to operation 630 where hidden storage manager 210 denies access to the request by returning a STATUS_OBJECT_NAME_NOT_FOUND status within the return value.

When the hidden storage manager 210 has determined the request to create a file or directory is not within the hidden storage area and the application or program is not registered, the process moves to operation 640 where the hidden storage manager 210 further determines if the requested size of the creation will cause the available space (excluding the hidden space) to be less than the performance margin. When the requested creation size does cause the available space (excluding the hidden space) to be less than the performance margin, then the process moves to operation 650 where the hidden storage manager 210 erases enough files within the hidden storage area to satisfy the creation request and maintain the performance margin. The hidden storage manager 210 then returns to the calling process a return code of: FLT_PREOP_SUCCESS_NO_CALLBACK. According to one embodiment, a list of the erased files/data are communicated back to the registered processes that are utilizing the hidden storage space. According to one embodiment, when the performance margin can not be maintained due to not enough storage space, the performance margin may be reduced or eliminated. Different methods may be used in reducing the performance margin. For example, the performance margin may be reduced some predetermined percentage (i.e. 5%, 10%, 15%, 20%, . . . ). The performance margin may be eliminated when it is below a threshold (i.e. 50%). According to one embodiment, the hidden storage may also be eliminated when the available space on the device is below some predetermined threshold.

Figure 7:
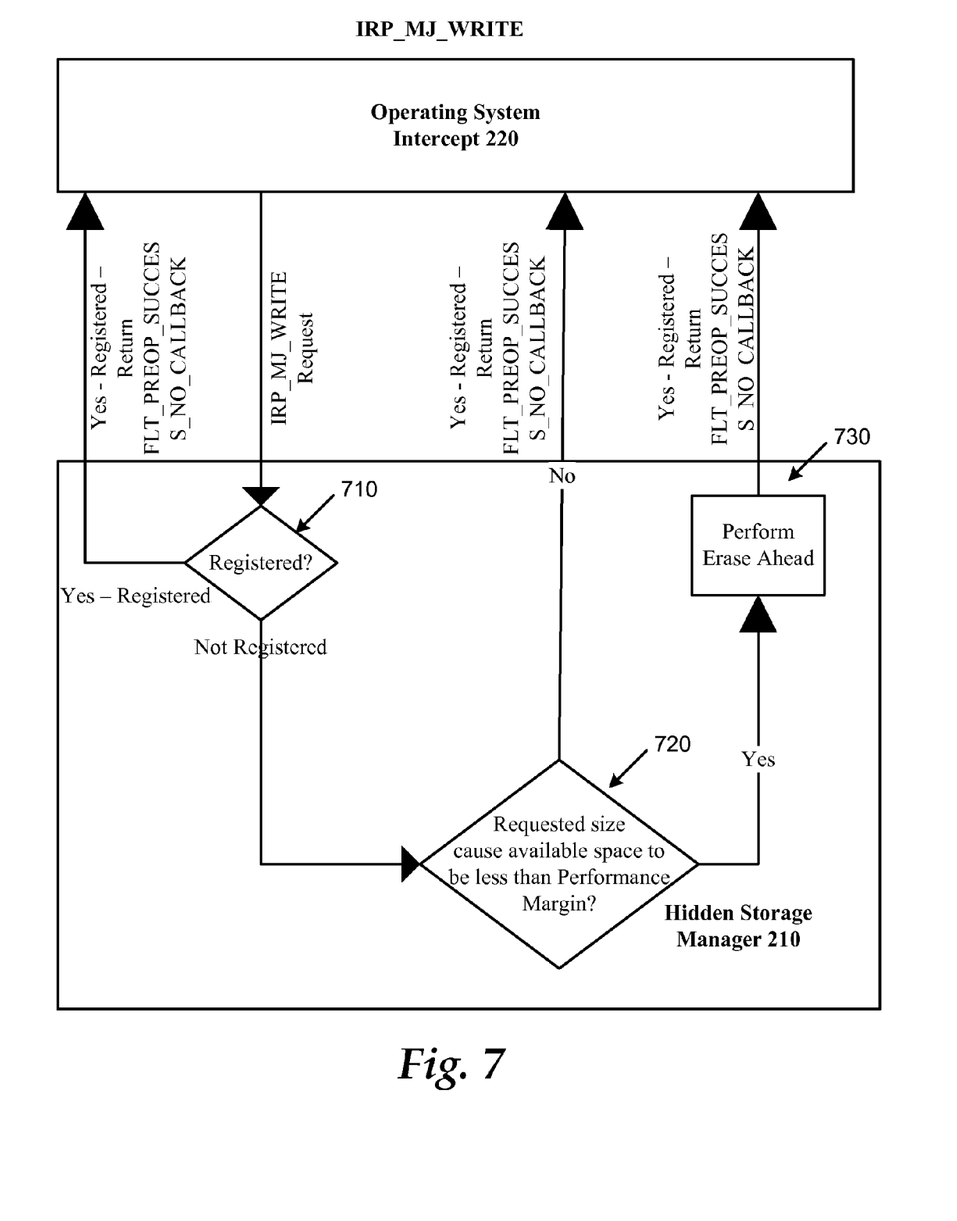
FIG. 7 illustrates a process for intercepting write requests.

FIG. 7 shows a process for intercepting write requests. According to one embodiment, operating system intercept 220 monitors for IRP_MJ_WRITE operations and passes them to hidden storage manager 210. The IRP_MJ_WRITE operation is similar to the IRP_MJ_CREATE functionality in that the hidden storage manager 210 helps to insure that the write operation will maintain the performance margin. The hidden storage manager 210 utilizes a Preoperation callback. Upon the call into the Preoperation callback for the IRP_MJ_WRITE, the hidden storage manager 210 determines at process 710 if the calling process has been previously registered with the hidden storage manager 210. If the process is registered with the hidden storage manager 210, then the process is entitled to full access to the volume and the hidden storage manager 210 returns from the Preoperation callback indicating: FLT_PREOP_SUCCESS_NO_CALLBACK. This return value informs the operating system intercept 220 that the hidden storage manager 210 is finished with this operation and does not require any more callbacks related to this function. In essence, the handling of the IRP_MJ_WRITE in this manner with a registered process serves to allow the registered process full access to the hidden storage.

When the hidden storage manager 210 has determined the application or program is not registered, the process moves to operation 720 and the hidden storage manager 210 further determines if the requested size of the write operation will cause the available space (excluding the hidden space) to be less than the performance margin. If the available space will be less than the performance margin, the process moves to operation 730 and the hidden storage manager 210 erases enough files within the hidden storage area to satisfy the write operation request and maintain the performance margin. The hidden data manager 210 returns to the calling process a return code of: FLT_PREOP_SUCCESS_NO_CALLBACK. As discussed above, a list of the erased files/data may also be communicated back to the registered processes that are utilizing the hidden storage space.

In order to further improve the performance of the use of hidden storage, an optional component can be utilized by hidden storage manager 210. A performance bottleneck is potentially created by synchronously interlocking the maintenance of the performance margin with the requests to create files/directories (IRP_MJ_CREATE) and the request to write to files (IRP_MJ_WRITE). The applications or programs initiating the call to the operating system to create or write to a file may experience long wait times if the hidden storage manager 210 erases files to satisfy the requests.

Figure 8:
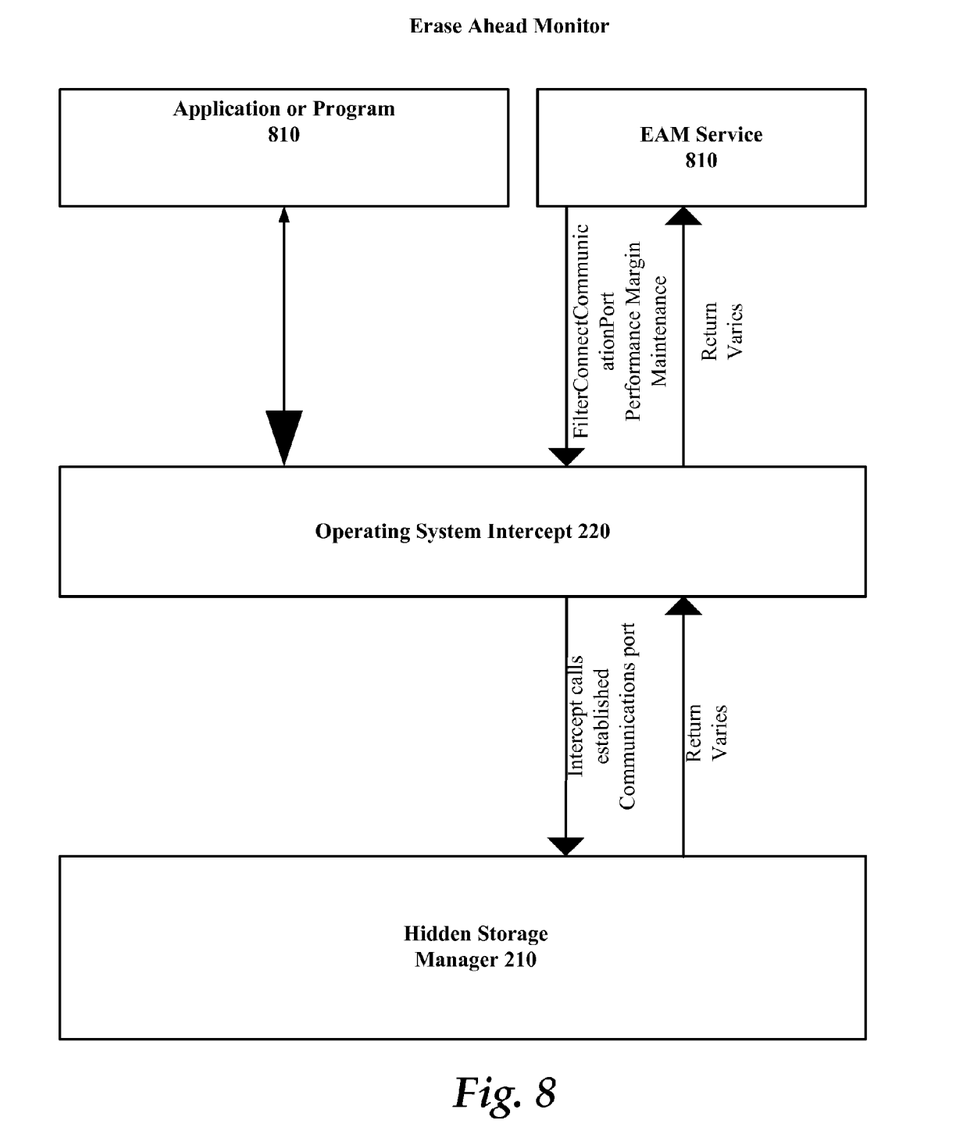
FIG. 8 shows using a monitoring program with a hidden storage manager.

FIG. 8 shows using a monitoring program with a hidden storage manager. By utilizing a monitoring program (EAM Service) a majority of the delays can often be avoided. The EAM Service 810 utilizes a time based monitoring method in that it periodically checks the available space and compares it to the performance margin for each supported storage device. The EAM Service 810 anticipates the need to perform most erase functions prior to the actual need for them to be performed and thus can initiate the erase functions asynchronously from the hidden storage manager 210 and other programs or applications. The EAM Service 810 initiates the erase functions at a low priority within the system to maintain the overall system performance The EAM Service communicates with the hidden storage manager 210 via the established communication port. The hidden storage manager 210 and the EAM Service monitor/communicate the details about the performance margins on the storage devices.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for interacting with data in hidden storage, comprising:
   determining when a file system request is made on a computing device that involves data on a storage device comprising a hidden storage area that is hidden from an operating system and programs that are configured to operate on the computing device;
   modifying a value of an amount of available space on the computing device before returning the value to an unauthorized process such that the amount of available space includes a size of the hidden storage and an amount of free space within the storage device; and
   returning the value to an unauthorized process such that usage of the hidden storage space remains hidden from the unauthorized process.

2. The method of claim 1, further comprising determining when a process is a registered process; wherein any registered process is an authorized process and is authorized to perform file system operations within the hidden storage.

3. The method of claim 1, further comprising configuring a size of the hidden storage within the storage device based on at least two of the factors comprising: a size of the storage device; a size of available space on the device; a performance of the computing device; a performance of the storage device; a type of memory installed in the computing device, a network communication speed.

4. The method of claim 1, further comprising intercepting the file system request; allowing the file system request to proceed when the file system request comes from an authorized process; and denying the file system request to proceed when the file system request comes from an unauthorized process.

5. The method of claim 1, wherein denying the file system request to proceed comprises denying access to stored data in the hidden storage.

6. The method of claim 5, further comprising erasing data from the hidden storage area when a requested creation size causes an available space on the storage device to be less than a preset performance margin.

7. The method of claim 2, further comprising setting a performance margin such that a buffer of available storage space is maintained within the storage device; wherein hidden storage may be erased to maintain the performance margin.

8. The method of claim 2, further comprising periodically monitoring the storage to determine a currently available space and comparing the currently available space to the performance margin and when the currently available space exceeds the performance margin a portion of the data in the hidden storage is erased.

9. A computer-readable storage medium, excluding a signal, having computer-executable instructions for interacting with data in hidden storage, comprising:
   intercepting a file system request from a process that is made on a computing device that involves data on a storage device comprising a hidden storage area that is hidden from an operating system and programs that are configured to operate on the computing device; and
   returning a value of a size of remaining storage on the storage device to an unregistered process such that usage of the hidden storage space always remains hidden from the unregistered process.

10. The computer-readable storage medium of claim 9, wherein the hidden storage is used to store data that is received from computing devices on a network.

11. The computer-readable storage medium of claim 9, further comprising configuring a size of the hidden storage within the storage device based on at least two of the factors comprising: a size of the storage device; a size of available space on the device; a performance of the computing device; a performance of the storage device; a type of memory installed in the computing device, a network communication speed.

12. The computer-readable storage medium of claim 9, further comprising modifying a value of an amount of available space before returning the value to an unregistered process such that the amount of available space includes a size of the hidden storage and an amount of free space within the storage device.

13. The computer-readable storage medium of claim 9, wherein denying the file system request to proceed comprises denying access to store data in the hidden storage and access data in the hidden storage.

14. The computer-readable storage medium of claim 13, further comprising erasing data from the hidden storage area on the storage device to erase a portion of the hidden storage before the space is requested by an unregistered process.

15. The computer-readable storage medium of claim 11, further comprising setting a performance margin such that a buffer of available storage space is maintained within the storage device; wherein hidden storage may be erased to maintain the performance margin.

16. The computer-readable storage medium of claim 11, further comprising providing an application programming interfaces (API) to access, utilize and report status of the hidden data storage.

17. A system for interacting with data in hidden storage, comprising:
 a storage device comprising a hidden storage area that is hidden from an operating system and unauthorized processes;
 a processor and a computer-readable medium;
 an operating environment stored on the computer-readable medium and executing on the processor; and
 a hidden storage manager operating under the control of the operating environment and operative to:
  intercept a file system request that involves data on the storage device; and
  returning a value of a size of remaining storage on the storage device that hides a value of a size of the hidden storage area to an unauthorized process such that usage of the hidden storage space always remains hidden from the unauthorized process.

18. The system of claim 17, further comprising determining when the process is a registered process; wherein any registered process is an authorized process and is authorized to perform file system operations within the hidden storage.

19. The system of claim 18, further comprising erasing data from the hidden storage area when a requested creation size causes an available space on the storage device to be less than a preset performance margin.

20. The system of claim 17, further comprising setting a performance margin such that a buffer of available storage space is maintained within the storage device; wherein hidden storage may be erased to maintain the performance margin.

* * * * *